US012645356B2

(12) United States Patent
Flynt et al.

(10) Patent No.: US 12,645,356 B2
(45) Date of Patent: Jun. 2, 2026

(54) STEERING WHEEL CAPACITIVE CONTROL

(71) Applicant: Atieva, Inc., Newark, CA (US)

(72) Inventors: Dave Wayne Flynt, Newark, CA (US);
Yunwei Yang, Newark, CA (US)

(73) Assignee: Atieva, Inc., Newark, CA (US)

( * ) Notice: Subject to any disclaimer, the term of this
patent is extended or adjusted under 35
U.S.C. 154(b) by 0 days.

(21) Appl. No.: 18/902,288

(22) Filed: Sep. 30, 2024

(65) Prior Publication Data

US 2025/0147653 A1     May 8, 2025

Related U.S. Application Data

(63) Continuation-in-part of application No. 18/504,048,
filed on Nov. 7, 2023, now Pat. No. 12,461,626.

(51) Int. Cl.
G06F 3/0488 (2022.01)
B60K 35/10 (2024.01)
B62D 1/04 (2006.01)
G06F 3/044 (2006.01)

(52) U.S. Cl.
CPC ............ G06F 3/0488 (2013.01); B60K 35/10
(2024.01); B62D 1/046 (2013.01); **G06F
3/044** (2013.01); B60K 2360/1438 (2024.01);
B60K 2360/782 (2024.01)

(58) Field of Classification Search
CPC ....... G06F 3/0488; G06F 3/044; B60K 35/10;
B60K 2360/1438; B60K 2360/782; B62D
1/046
See application file for complete search history.

(56) References Cited

U.S. PATENT DOCUMENTS

2007/0152977 A1* 7/2007 Ng ...................... G06F 3/03547
345/173
2010/0268426 A1* 10/2010 Pathak ................ G06F 3/04886
345/173

(Continued)

OTHER PUBLICATIONS

Advisory Action received for U.S. Appl. No. 18/504,048, mailed on
Nov. 25, 2024, 3 pages.

(Continued)

*Primary Examiner* — Lixi C Simpson
(74) *Attorney, Agent, or Firm* — Womble Bond Dickinson
(US) LLP

(57) ABSTRACT

This disclosure provides systems, devices, apparatus, and
methods, including computer programs encoded on storage
media, for activating a function by selecting a graphical user
interface (GUI) element on a screen of a vehicle using a
capacitive controller. In some implementations, the method
can include detecting an active selection of a first GUI
element on the screen of the vehicle selectable using the
capacitive controller positioned on a steering wheel of the
vehicle. In addition, the method can include detecting a
movement of a finger of a driver in the vehicle across the
capacitive controller on the steering wheel of the vehicle.
The method can further include determining a direction of
the movement of the finger. The method can additionally
include automatically moving the active selection to a
second selectable GUI element on the screen based on the
direction of the movement of the finger.

19 Claims, 20 Drawing Sheets

(56) References Cited

U.S. PATENT DOCUMENTS

| | | | | |
|---|---|---|---|---|
| 2015/0046030 A1* | 2/2015 | Nishito | .................. | G06F 3/017 |
| | | | | 701/36 |
| 2016/0121825 A1 | 5/2016 | Kim | | |
| 2017/0024553 A1* | 1/2017 | Chang | .................... | G06V 40/13 |
| 2017/0357398 A1* | 12/2017 | Alonso-Ruiz | ....... | G06F 3/04817 |
| 2018/0196589 A1 | 7/2018 | Feit et al. | | |
| 2019/0152319 A1* | 5/2019 | Wan | ....................... | B62D 1/046 |
| 2020/0039558 A1 | 2/2020 | Aerts et al. | | |
| 2020/0307379 A1 | 10/2020 | Balain et al. | | |
| 2021/0031711 A1 | 2/2021 | Marcolino et al. | | |
| 2021/0252979 A1 | 8/2021 | Pomytkin et al. | | |
| 2022/0314794 A1 | 10/2022 | Eo et al. | | |
| 2023/0120950 A1* | 4/2023 | Ranjan | .................. | G06F 3/0416 |
| | | | | 345/173 |
| 2023/0152961 A1* | 5/2023 | Perea-Ochoa | ...... | G06F 3/04886 |
| | | | | 715/764 |
| 2024/0267612 A1 | 8/2024 | Shimosato | | |

OTHER PUBLICATIONS

Final Office Action received for U.S. Appl. No. 18/504,048, mailed on Oct. 25, 2024, 11 pages.

International Search Report and Written Opinion received for PCT Patent Application No. PCT/US2024/054562, mailed on Nov. 26, 2024, 11 pages.

Non-Final Office Action received for U.S. Appl. No. 18/504,048, mailed on Jun. 14, 2024, 11 pages.

International Search Report and Written Opinion received for PCT Patent Application No. PCT/US2024/054573, mailed on Feb. 6, 2025, 13 pages.

Non-Final Office Action received for U.S. Appl. No. 18/504,048, mailed on Dec. 13, 2024, 13 pages.

* cited by examiner

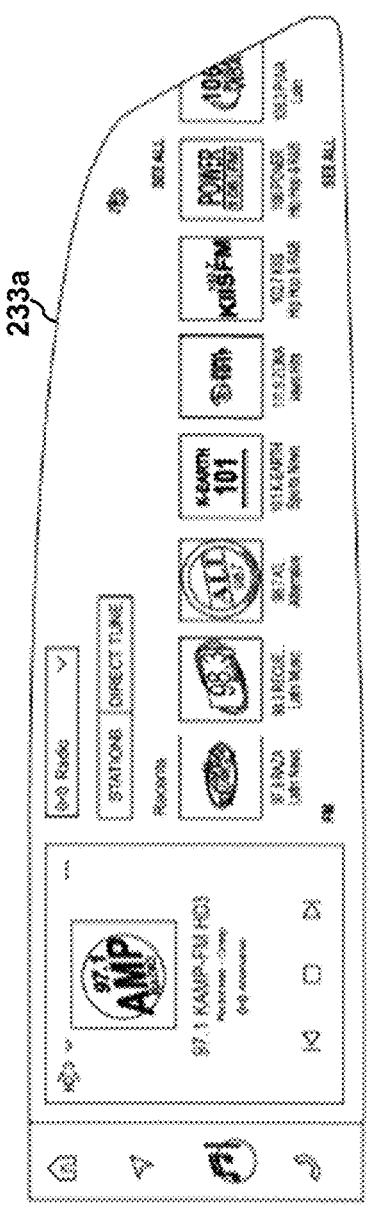
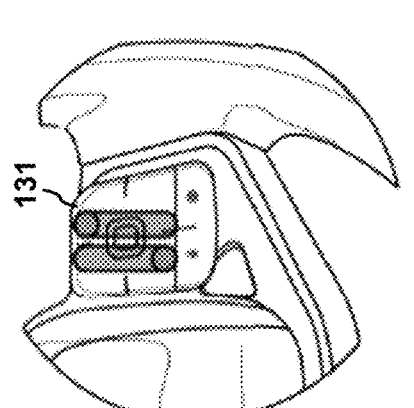
FIG. 2

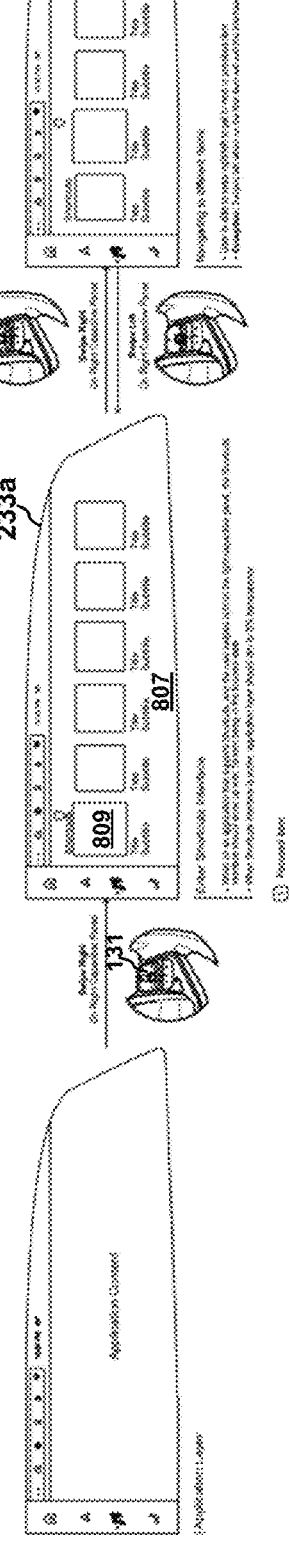
FIG. 8

Shorcuts - Empty State (Nav, Media, Phone Recents)

When there's no recent history from the app, empty state should be displayed

233a

Recents

Start using the app to access your Recents here

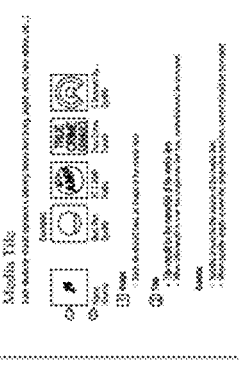
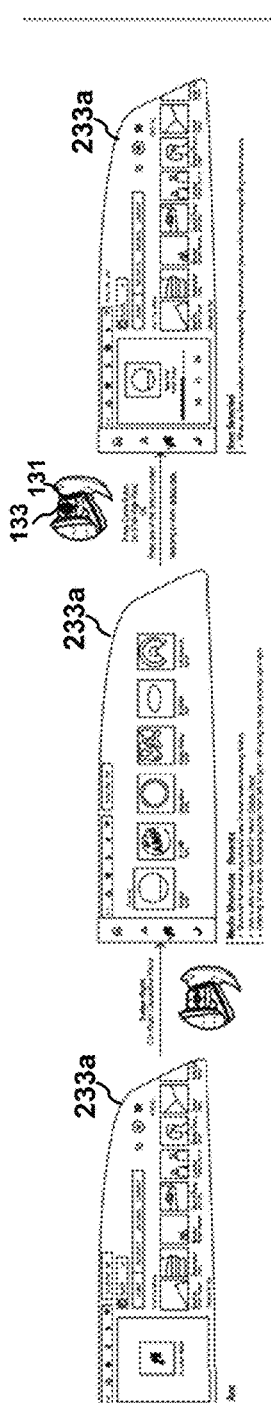
FIG. 13

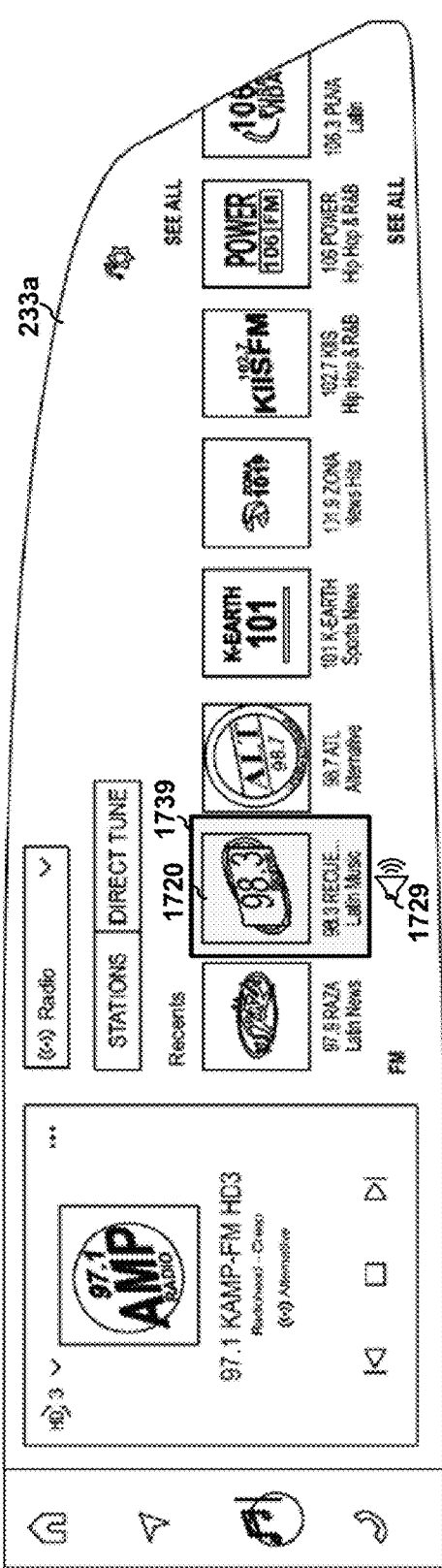
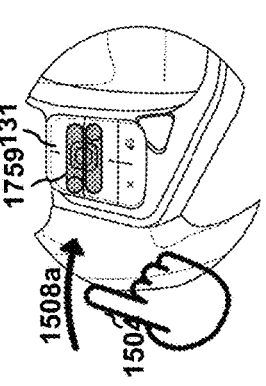
FIG. 17

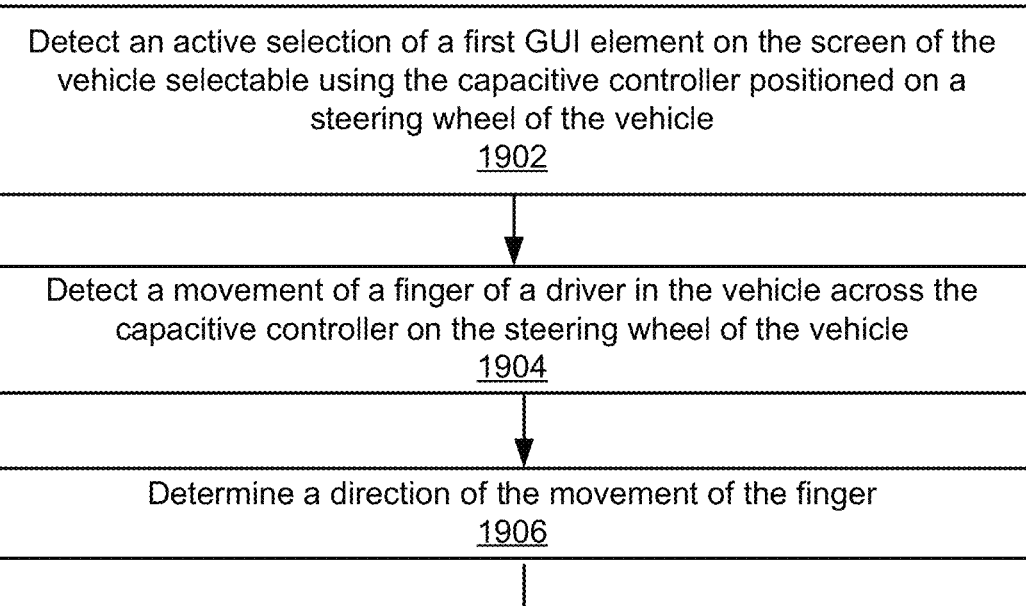

Detect an active selection of a first GUI element on the screen of the vehicle selectable using the capacitive controller positioned on a steering wheel of the vehicle
1902

Detect a movement of a finger of a driver in the vehicle across the capacitive controller on the steering wheel of the vehicle
1904

Determine a direction of the movement of the finger
1906

Automatically move the active selection to a second selectable GUI element on the screen based on the direction of the movement of the finger, the second selectable GUI element being closest to the first GUI element in the direction of the movement of the finger
1908

FIG. 19

STEERING WHEEL CAPACITIVE CONTROL

CROSS-REFERENCE TO RELATED APPLICATIONS

This application claims the benefit of U.S. patent application Ser. No. 18/504,048, filed 7 Nov. 2023 the disclosure of which is incorporated herein by reference in its entirety.

TECHNICAL FIELD

The present disclosure relates generally to automobiles, and more particularly, to a method and apparatus for allowing a user in the vehicle using a capacitive controller to select the function and automatically perform the function.

BACKGROUND

Operating a vehicle safely requires a driver's constant and focused attention. The complexities of navigating traffic, maintaining control of the vehicle, and anticipating potential hazards demand significant cognitive resources. The act of driving is increasingly challenged by the desire to perform additional tasks behind the wheel. In-car technology advancements, while offering convenience, often introduce distractions that can significantly hinder a driver's ability to perform these additional tasks. Simple actions like using a navigation system or selecting options from a complex menu can divert a driver's attention and cognitive focus from the primary task of maintaining safe operation of the vehicle. Accordingly, there is a need for automobile manufacturers to develop technologies that can reduce driver's distraction while seamlessly integrating these in-car technology advancements into an elevated driving experience.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

Steering wheel capacitive control and method in using the same. In some embodiments, method can include detecting an active selection of a first GUI element on the screen of the vehicle selectable using the capacitive controller positioned on a steering wheel of the vehicle. The method also includes detecting a movement of a finger of a driver in the vehicle across the capacitive controller on the steering wheel of the vehicle and determining a direction of the movement of the finger. The method additionally includes automatically moving the active selection to a second selectable GUI element on the screen based on the direction of the movement of the finger. In some embodiments, the second selectable GUI element is closest to the first GUI element in the direction of the movement of the finger.

Other embodiments of this aspect include corresponding computer systems, apparatus, and computer programs recorded on one or more computer storage devices, each configured to perform the actions of the methods.

To the accomplishment of the foregoing and related ends, the one or more aspects comprise the features hereinafter fully described and particularly pointed out in the claims.

The following description and the drawings set forth in detail certain illustrative features of the one or more aspects. These features are indicative, however, of but a few of the various ways in which the principles of various aspects may be employed.

DESCRIPTION OF THE DRAWINGS

The present invention is illustrated by way of example and not limitation in the figures of the accompanying drawings in which like references indicate similar elements.

FIG. 2 illustrates a scroll mode according to some embodiments of the disclosure.

FIG. 8 illustrates entering and navigating short cuts according to some embodiments of the disclosure.

FIG. 13 illustrates short cuts for media according to some embodiments of the disclosure.

FIG. 17 illustrates an example of various feedback mechanisms in response to detecting the active selection of a selectable GUI element, according to an embodiment.

FIG. 19 is a data flow diagram of a process for activating a function by selecting a GUI element on a screen of a vehicle using a capacitive controller, according to an embodiment.

DETAILED DESCRIPTION

Figure 1:
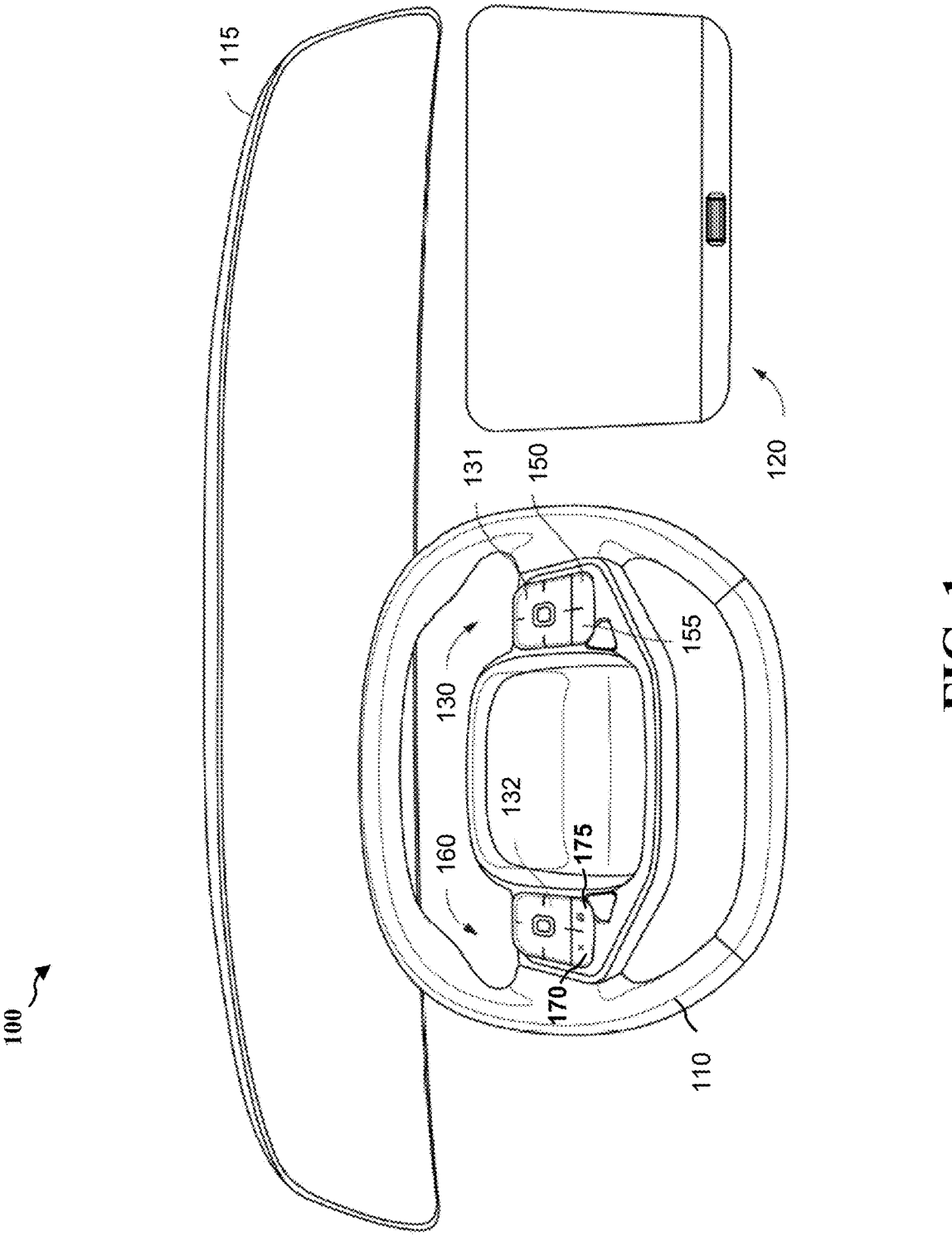
FIG. 1 illustrates a front view of portions of the interior of a vehicle that a driver may view including a wheel, a front cockpit display, and a pilot panel display according to some embodiments.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" or "example" or "implementation" means that a particular feature, structure, or characteristic described in connection with the embodiment can be included in at least some embodiments of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure. The terms "electric vehicle" and "EV" may be used interchangeably and refer to an all-electric vehicle.

Controlling various functions of a vehicle often requires navigating complex menus or sub-menus through touchscreens and physical controls, leading to potential distractions and decreased driving focus. As an example of prior art implementations, the driver having to go back and forth between buttons, touch-screens and the steering wheel makes interactions very difficult and counter-intuitive. As an example of prior art implementations, a driver often has to go to a touch-screen to switch to a different desired application function through various tab selections, and, often-times, is not able to switch to the desired application function. These prior art interaction techniques are very distracting to the driver.

Aspects of the present disclosure address the above-noted and other deficiencies by using capacitive controllers on the steering wheel that can be utilized to allow the driver to scroll through application functions and select application functions and activate application functions with one hand and a single finger (e.g., the thumb) on the front cockpit display right in front of them, while driving. This increases vehicle safety, by keeping the driver's hands on the wheel. As will be described below, selectable graphical user interface (GUI) elements of various frequently used applications (media, navigation, mobile phone, etc.) can be selected, based on the direction of the movement of the finger of a driver, quickly and with very little effort, while the driver keeps their hand on the steering wheel. As will be described in detail, various feedback mechanisms can feedback the driver after the system detects the active selection of the selectable GUI element.

In aspects of the disclosure, a method, a computer-readable medium, and an apparatus are provided. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

FIG. 1 is front view 100 of portions of the interior of some embodiments of a vehicle that a driver may view including a steering wheel 110, a front information center (IC) cockpit display 115, and a pilot panel display 120. It should also be understood that the terms "driver" and "user" can be used interchangeably throughout this disclosure. The steering wheel 110 includes a right steering wheel button control 130 and a left steering wheel button control 160. The right steering wheel button control 130 includes the custom button 150, a volume control button 155, and a right capacitive controller 131 (above the custom button 150 and volume control buttons 155—to be described in more detail hereafter). Similarly, in some embodiments, the left steering wheel button control 160 includes a cancel button 170 and a single press control button 175 next to it (e.g., to set activate HVAC, speed control, etc.), and a left capacitive controller 132 (above the two buttons and to be described in more detail hereafter).

In some embodiments, capacitive controllers 131 and 132 may be utilized by the driver to scroll through functions and select functions with one hand and a single finger (e.g., the thumb) while driving. In some embodiments, the vehicle on-board system controller 2001 of FIG. 20 (as will be described in FIG. 20) receives inputs from the right capacitive controller 131 and the left capacitive controller 132 and converts those inputs to actions taken with respect to content that is being displayed on the front IC cockpit display 115 and/or the pilot panel display 120, as well as other actions implemented or otherwise performed by appropriate vehicle systems and functionality.

In some embodiments, the right capacitive controller 131 can be utilized to allow the user to scroll through functions and select these functions on the right side of the front IC cockpit display 115 with one hand and a single finger (e.g., the thumb) while the user's hands are on, or proximate to, the steering wheel (e.g., while driving), whereas, the left capacitive controller 132 may be utilized to allow the user to scroll through functions and select functions on the left side of the front IC cockpit display 115 with one hand and a single finger (e.g., the thumb) while the user's hands are on, or proximate to, the steering wheel (e.g., while driving). However, in some embodiments, the right and left sides of the front IC cockpit display 115 may also be touch-screen such that the driver can touch functions to select them to add additional selection availability.

Embodiments relates to capacitive controllers on the steering wheel that may be utilized to allow the user to scroll through functions and select functions with one hand and a single finger (e.g., the thumb) on the front cockpit display right in front of them while the user's hands are on, or proximate to, the steering wheel (e.g., while driving). This increases vehicle safety, by keeping the driver's hands on the wheel. It has been found that capacitive controllers on the steering wheel to interact with the front cockpit display right in front of the driver provides very effortless interactions for the driver. For example, as will be described, frequently used functions may be completed quickly and with very little effort, while the driver keeps their hands on the steering wheel. As will be described, the right and left capacitive controllers as they interact with right and left IC cockpit displays involve contextual mapping, such that the driver can swipe left, right, up, down, to reach desired functions and then select them. As will be described, selection of a function can occur by a center press of the capacitive controller (e.g., in the middle of the capacitive controller) by the driver (e.g., such that it is an intentional selection by the driver). In some embodiments, the left and right capacitive controllers are capacitive sensors that include capacitive film to measure the swiping of the driver's finger. However, any electronic device to perform these functions may be used. As will be described, the most frequently used features by the driver can be easily searched for and selected by swiping on the capacitive controller with one finger. These common features include at least common functions, such as: media, navigation, mobile phone, data, etc. It should be appreciated that these interactions, such as, selecting media sources (e.g., music channel), answering a phone call, etc., are very familiar to how drivers interact with other devices (e.g., smart phones).

Various rulesets may be associated with the capacitive controllers. For example, the capacitive controllers may minimize false positive actions (e.g., avoid using small-movement input to prevent unintentional touch and disable capacitive input when the steering wheel is over a predetermined angle). Further, in some embodiments, the capacitive controllers can disable or ignore capacitive input under certain conditions, such as: steering wheel rotation being over a predetermined degree; when a user's hand touches the capacitive controller for more than a predetermined amount of time (in which case, steering wheel capacitive input should be ignored unit the next touch event); and a user should be able to turn off capacitive control from system settings. Additionally, in some embodiments, preemptive tasks are always given highest priority. For example, other capacitive control on the same side should not apply until the preemptive task is dealt with. Also, in some embodiments, when a preemptive task occurs, capacitive input for the capacitive controller is disabled/ignored for a predetermined amount of time to prevent accidental response to a preemptive task due to context switching. Further, as will be described, application shortcuts have a preset ruleset.

As to application switching, a driver should be able to quickly go the previous/next application by swiping up/down on the right capacitive controller 131 of the steering wheel. Further, each application can have a list of short cuts that can be displayed in tiles that can represent the most common/frequently used cases. Also, shortcuts can be triggered by swiping right on the right capacitive controller 131 of the steering wheel when on a supported application.

With reference to FIG. 2, a scroll mode will be described. As shown in FIG. 2, in scroll mode, the driver may swipe up or down on the right capacitive controller 131 of the steering wheel for browsing different content areas displayed on a screen 233*a* of the vehicle. In the example, various radio stations are shown.

Figure 3:
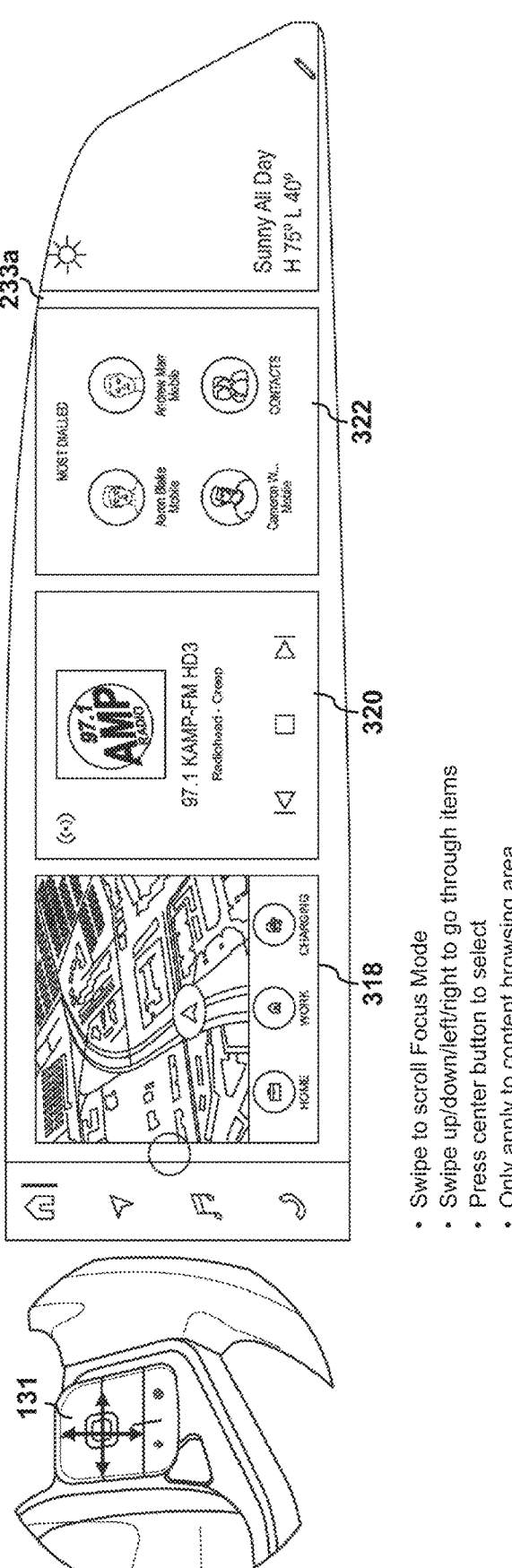
FIG. 3 illustrates a focus mode according to some embodiments of the disclosure.

With reference to FIG. 3, a focus mode will be described. To enter focus mode, the driver may do a full swipe (e.g., up or down) on the right capacitive controller 131 of the steering wheel. The driver may then swipe (up/down/left/right) to go through all of the various selectable GUI elements as shown on the right IC display of the screen 233*a*. As shown in FIG. 3 these items may include: navigation 318, media 320 (e.g., radio), voice calls 322 (e.g., most dialed), data input (e.g., weather), etc., as shown on the right IC display of the screen 233*a*. In particular, the driver, utilizing their finger can swipe on the right capacitive controller 131 to the desired item and press the center button/portion of the right capacitive controller 131 to activate/implement the application item desired (e.g., music, phone call, navigation, data (e.g., weather), etc.). It should be appreciated that the driver may utilize the left capacitive controller of the steering wheel for swiping (up/down/left/right) to go through all of the various selectable items as shown on the left IC display and press the center button/portion of the left capacitive controller to activate/implement the item desired (e.g., trip information, speed setting, adaptive cruise control (ACC), HWA, etc.). However, any electronic device to perform these functions may be used.

Various other examples will be hereafter described.

Figure 4:
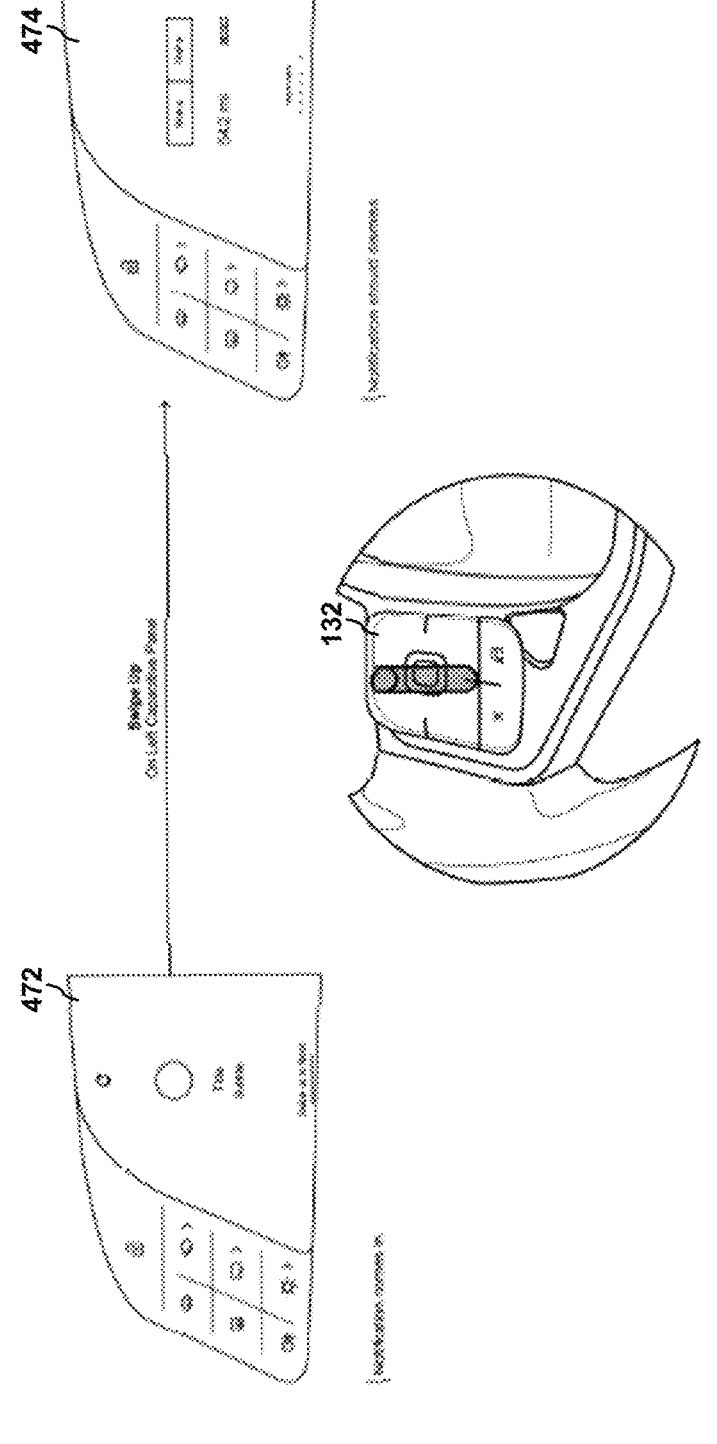
FIG. 4 illustrates a vehicle notification according to some embodiments of the disclosure.

With reference to FIG. 4, a vehicle notification will be described. As shown in FIG. 4, a vehicle notification is provided to the driver that is a preemptive task. The driver can then swipe up on the left capacitive controller 132 of the steering wheel to dismiss the notification 472 to return to the previous display 474 (e.g., trip description) on the left IC display.

Figure 5:
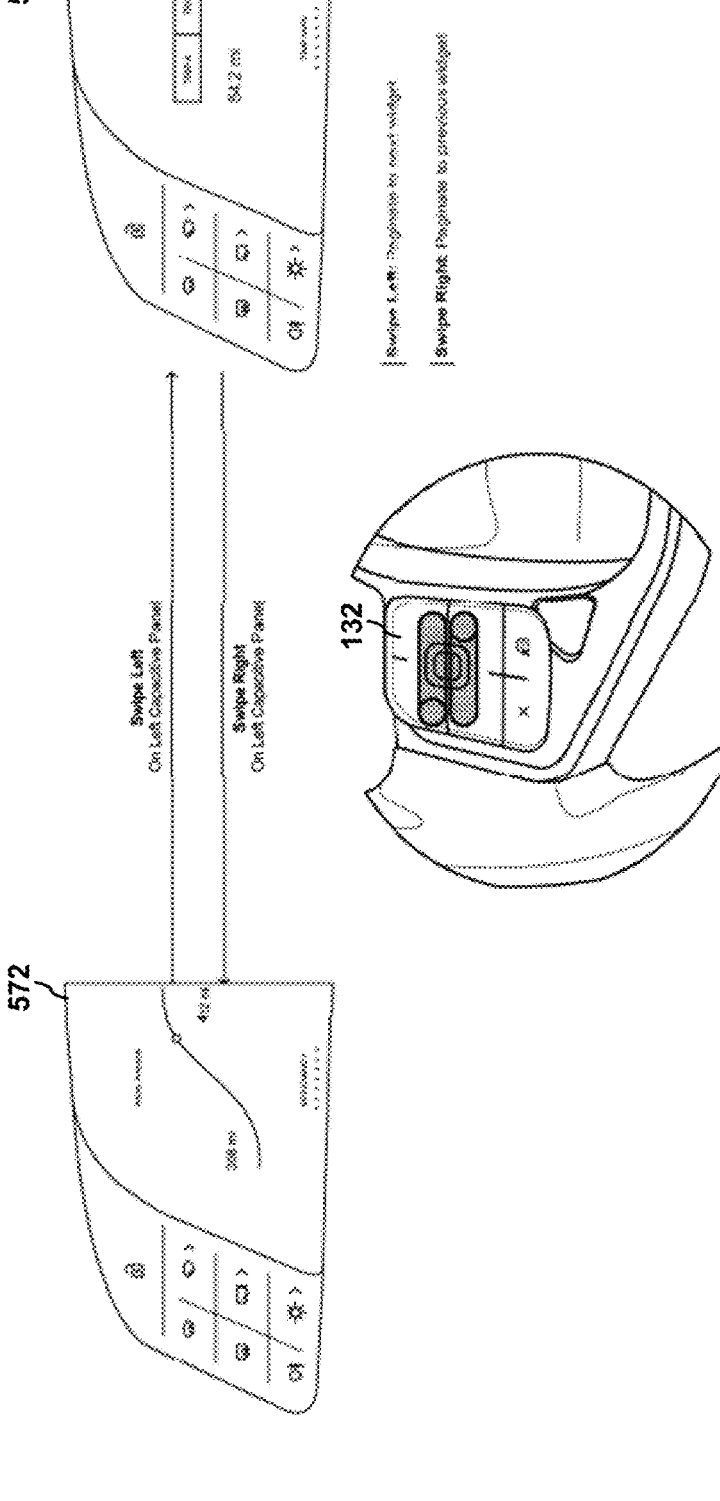
FIG. 5 illustrates browsing different content on a display according to some embodiments of the disclosure.

With reference to FIG. 5, browsing different content on the left IC display will be described. As shown in FIG. 5, a driver may swipe left/right on the left capacitive controller 132 of the steering wheel to browse/paginate through content (e.g., different widgets) on the left IC display. As shown in this example, in some embodiments, the driver may browse through a trip information widget 572 and energy efficiency information widget 574 by swiping left/right on the left capacitive controller 132 of the steering wheel. As an example, swiping left paginates to the next widget (e.g., trip information widget 572) and swiping right paginates to the previous widget (e.g., energy efficiency information widget).

Figure 6:
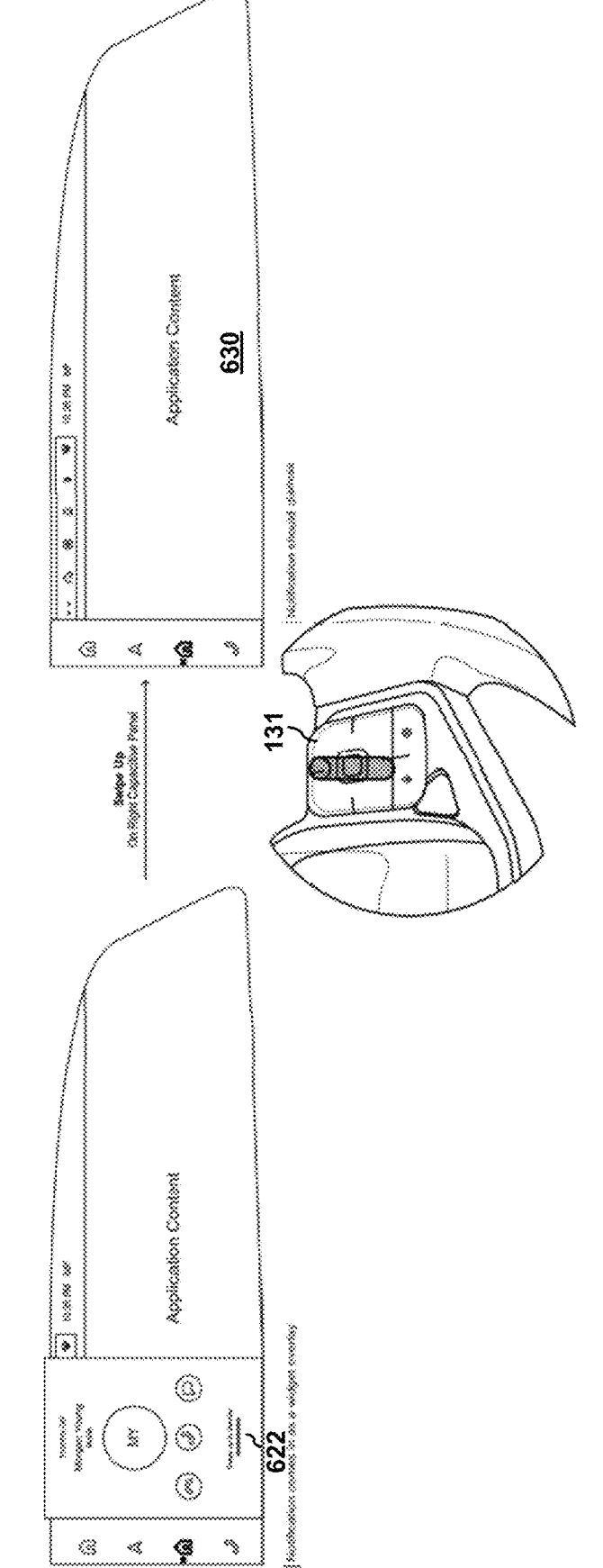
FIG. 6 illustrates an infotainment notification according to some embodiments of the disclosure.

With reference to FIG. 6, an infotainment notification will be described. As shown in FIG. 6, the infotainment notification is provided to the driver that is a preemptive task. In this example, the infotainment notification may be a mobile call coming in as a widget overlay 622. In some embodiments, the driver may then swipe up on the right capacitive controller 131 of the steering wheel to dismiss the mobile call widget overlay 622 to return to the previous application display 630 on the right IC display.

Figure 7:
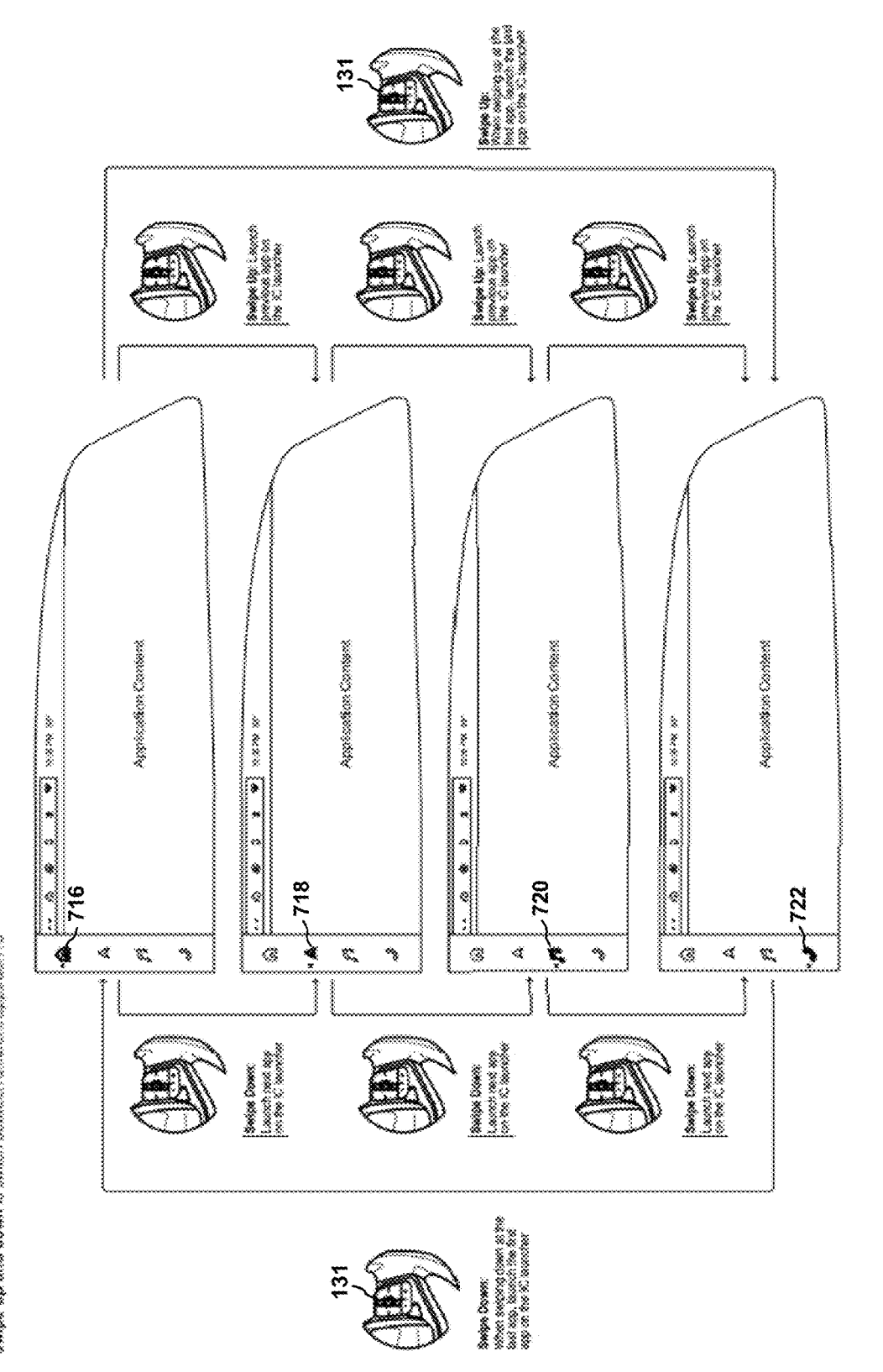
FIG. 7 illustrates application switching according to some embodiments of the disclosure.

With reference to FIG. 7, application switching will be described. As shown in FIG. 7, by swiping up and down by the driver on the right capacitive controller 131 of the steering wheel applications on the right IC display can be switched. As an example, there may be a predefined number of applications. For example, when swiping up at the first application, the last application is launched on the IC launcher. As shown in FIG. 7, swiping up at the first application (e.g., home application 716) by the driver on the right capacitive controller 131 of the steering wheel, vehicle on-board system controller 2001 launches the last application (e.g., mobile phone application 722). Swipes up launch previous applications on the IC launcher. On the other hand, when swiping down at the last application, the first application is launched on the IC launcher. Swipes down launch next applications on the IC launcher. As an example, swiping down by the driver on the right capacitive controller 131 of the steering wheel, vehicle on-board system controller 2001 launches the next application (e.g., navigation application 718). If the driver continues swiping down on the right capacitive controller 131 of the steering wheel, vehicle on-board system controller 2001 launches the next application (e.g., media application 720).

With reference to FIG. 8, entering and navigating short cuts will be described. As shown in FIG. 8, by swiping right by the driver on the right capacitive controller 131 of the steering wheel, application item shortcuts interface 807 on the right IC display of the screen 233a can be entered and navigated. As an example, there may be a predefined number of shortcuts for application items. In some embodiments, after swiping right, the driver can swipe left or right to select one of the recent application items. In some embodiments, the driver can press the center button on the right capacitive controller 131 to confirm the selection of the application item as shortcut. When on the first item, swiping left will exit out of the shortcut interface. When an application item supports shortcuts, the shortcut should be in the focused state. In some embodiments, swiping right on the right capacitive controller 131 causes the application item shortcuts interface 807 to display the first shortcut item (e.g., shortcut item 809) in the focused state. In some embodiments, when application item shortcuts interface 807 is active, application layer dims to a predefined transparency value. When an application item is in the focused state it should be a predetermined amount larger than the original state. In some embodiments, the driver can swipe left or right to get to next or previous recent application items on the right IC display and the driver can press the center button on the right capacitive controller 131 to confirm the selection of the application item as shortcut.

Figure 9:
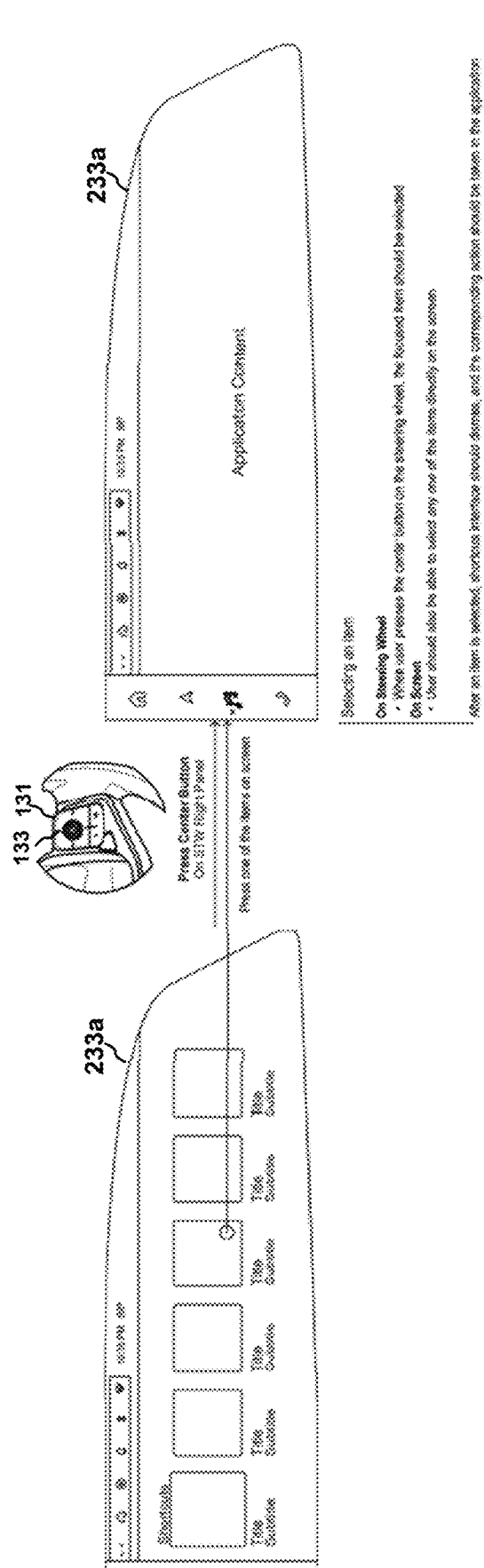
FIG. 9 illustrates selecting an application item for a shortcut according to some embodiments of the disclosure.

With reference to FIG. 9, selecting an application item for a shortcut will be described. As shown in FIG. 9, the driver can press the center button 133 on the right capacitive controller 131 to confirm the selection of an application item as a shortcut on the right IC display of the screen 233a. Also, in some embodiments, the driver can also select the application item as a shortcut on the right IC display of the screen 233a by touching the application item with their finger on the right IC touchscreen display of the screen 233a itself. After an application item is selected, the shortcut interface should be dismissed, and the corresponding action should be taken in the application.

Figure 10:
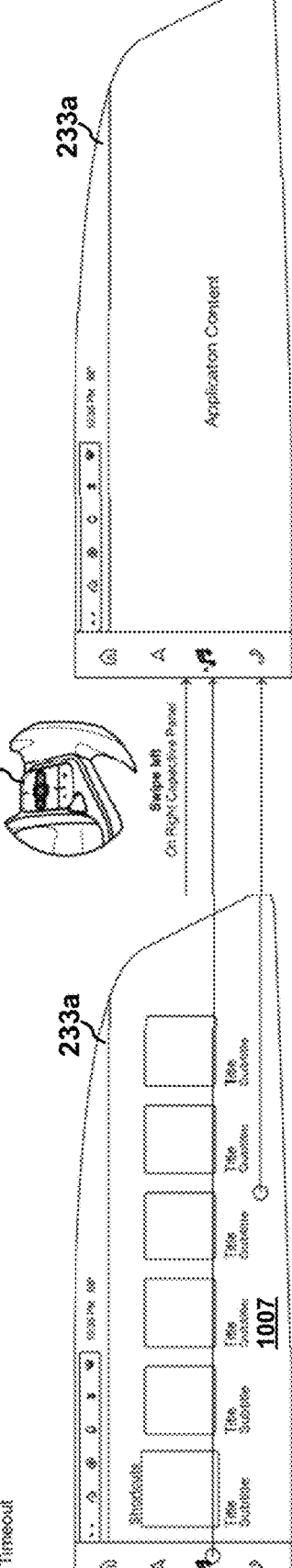
FIG. 10 illustrates exiting out of the shortcut interface according to some embodiments of the disclosure.

With reference to FIG. 10, ways to exit out of the shortcut interface will be described. As shown in FIG. 10, in some embodiments, the to exit out the shortcuts interface 1007, the driver can: swipe left on the on the right capacitive controller 131 of the steering wheel when the focus is on the first application item on the right IC display of the screen 233a; the driver can tap anywhere outside of the applications items on the right IC display of the screen 233a; the driver can tap the application icon on the launcher on the right IC display of the screen 233a; or a timeout can occur. After exiting the shortcuts interface 1007 should hide and the application layer should appear.

Figure 11:
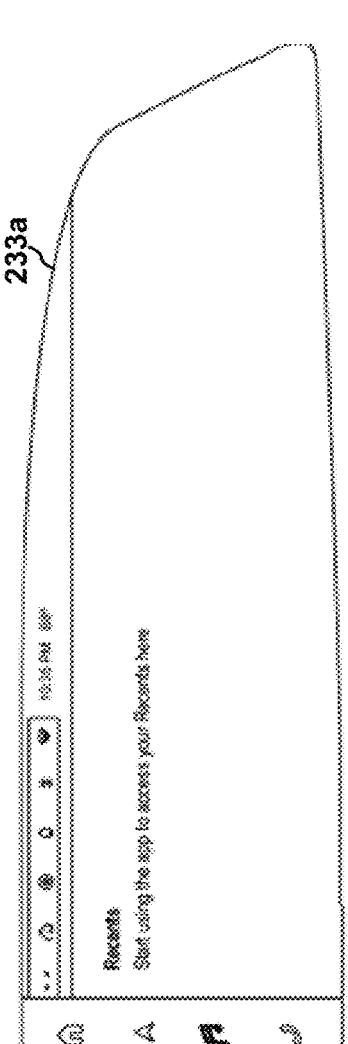
FIG. 11 illustrates an empty shortcut state according to some embodiments of the disclosure.

With reference to FIG. 11, an empty shortcut state will be described. As shown in FIG. 11, when there has been no recent history of application items used (e.g., navigation, media, mobile phone) an empty state should be displayed on the right IC display of the screen 233a.

Figure 12:
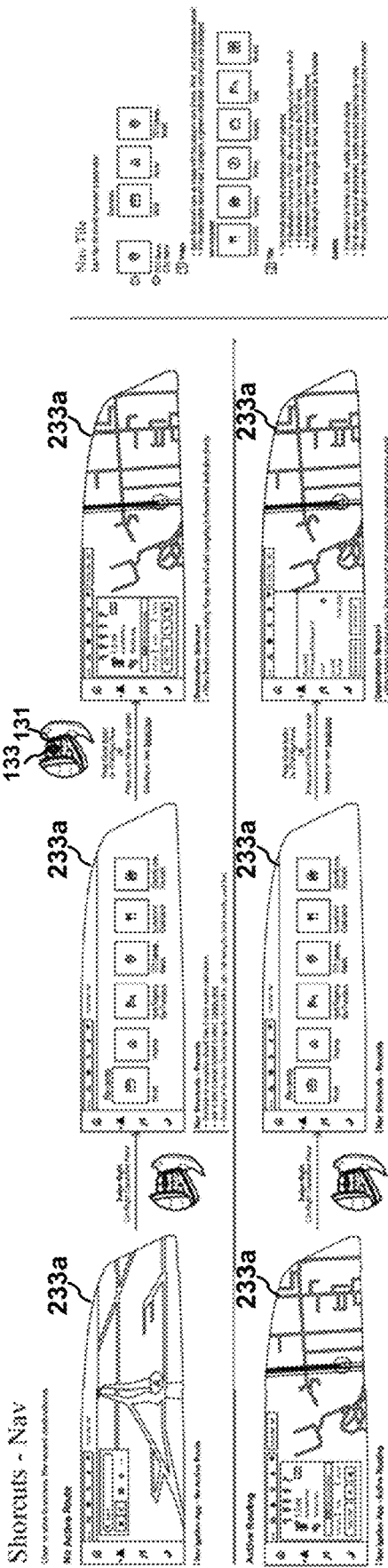
FIG. 12 illustrates short cuts for navigation according to some embodiments of the disclosure.

With reference to FIG. 12, short cuts for navigation will be described. As shown in FIG. 12, no active routing is being used, and by swiping right by the driver on the right capacitive controller 131 of the steering wheel, shortcuts for the 6 most recent destinations appear on the right IC display of the screen 233a, the driver can then swipe right/left to scroll to a recent destination (destinations are shown from left to right (left being most recently used)), the driver can push the center button 133 on the right capacitive controller 131 to select the destination or press the destination on the touchscreen right IC display of the screen 233a, and the navigation application should start navigating to the selected destination. Further, as shown in FIG. 12, below initiating active routing, after active routing has been established, the selection of new destination operates primarily in the exact same way. However, once active routing is already being done, once a user selects a recent destination, the navigation application also displays a place of interest (POI) graphical representation showing two options to either add as new destinations or to add as waypoints.

With reference to FIG. 13, short cuts for media will be described. As shown in FIG. 13, on the media application, by swiping right by the driver on the right capacitive controller 131 of the steering wheel, shortcuts for the 6 most recent listening history items (across different media sources), appear on the right IC display of the screen 233a. In some embodiments, the driver can the swipe right/left to scroll to a recent media item (media items are shown from left to right (left being most recently listened to)), the driver can push the center button 133 on the right capacitive controller 131 to select the desired media item or press the media item on the touchscreen right IC display of the screen 233a, and the media item will be selected for playback to the driver (under the corresponding media source).

Figure 14:
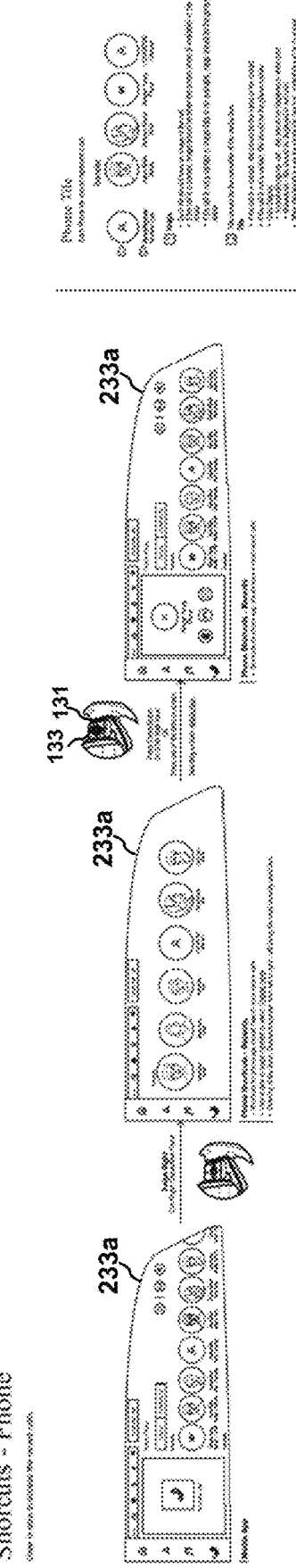
FIG. 14 illustrates short cuts for phone service according to some embodiments of the disclosure.

With reference to FIG. 14, shortcuts for phone service will be described. As shown in FIG. 14, on the phone application, by swiping right by the driver on the right capacitive controller 131 of the steering wheel, shortcuts for the most recent listening of phone calls (e.g., 6 calls), appear on the right IC display of the screen 233a. In some embodiments, the driver can the swipe right/left to scroll to a recent phone contact item (phone contact items are shown from left to right (left being most recently communicated with (incoming/outgoing call)), the driver can push the center button 133 on the right capacitive controller 131 to select the desired media item or press the phone call item on the touchscreen right IC display, and the phone call item (phone number) will be selected for making the phone call for the driver.

As previously described, embodiments relate to capacitive controllers on the steering wheel that may be utilized to allow the user to scroll through application functions and select application functions and activate application functions with one hand and a single finger (e.g., the thumb) on the front cockpit display right in front of them, while driving. This increases vehicle safety, by keeping the driver's hands on the wheel. As has been described, frequently used application functions may be completed quickly and with very little effort, while the driver keeps their hand on the steering wheel. As previously described in detail, the right and left capacitive controllers as they interact with right and left IC cockpit displays involve contextual mapping, such that the driver can swipe left, right, up, down, to reach desired functions and then select them for saving as shortcuts and/or for automatic implementation. For example, the selection of an application function for saving as a shortcut and/or automatic implementation can occur by a center press of the capacitive controller (e.g., in the middle of the capacitive controller) by the driver (e.g., such that it is intentional selection by the driver). As has been described, the most frequently used applications by the driver can be easily searched for and selected by swiping on the capacitive controller and pressing on the center press of the capacitive controller for saving as a shortcut for subsequent selection and/or for automatic implementation. These application functions include at least common application functions, such as: media, navigation, mobile phone, data, etc.

It should be appreciated that the operations of the previously described processes in some embodiments may be performed: by the vehicle on-board system controller 2001 of the vehicle 2000 including: a processor, memory communication links, user interfaces, etc., to implement the previously described processes.

Figure 15:
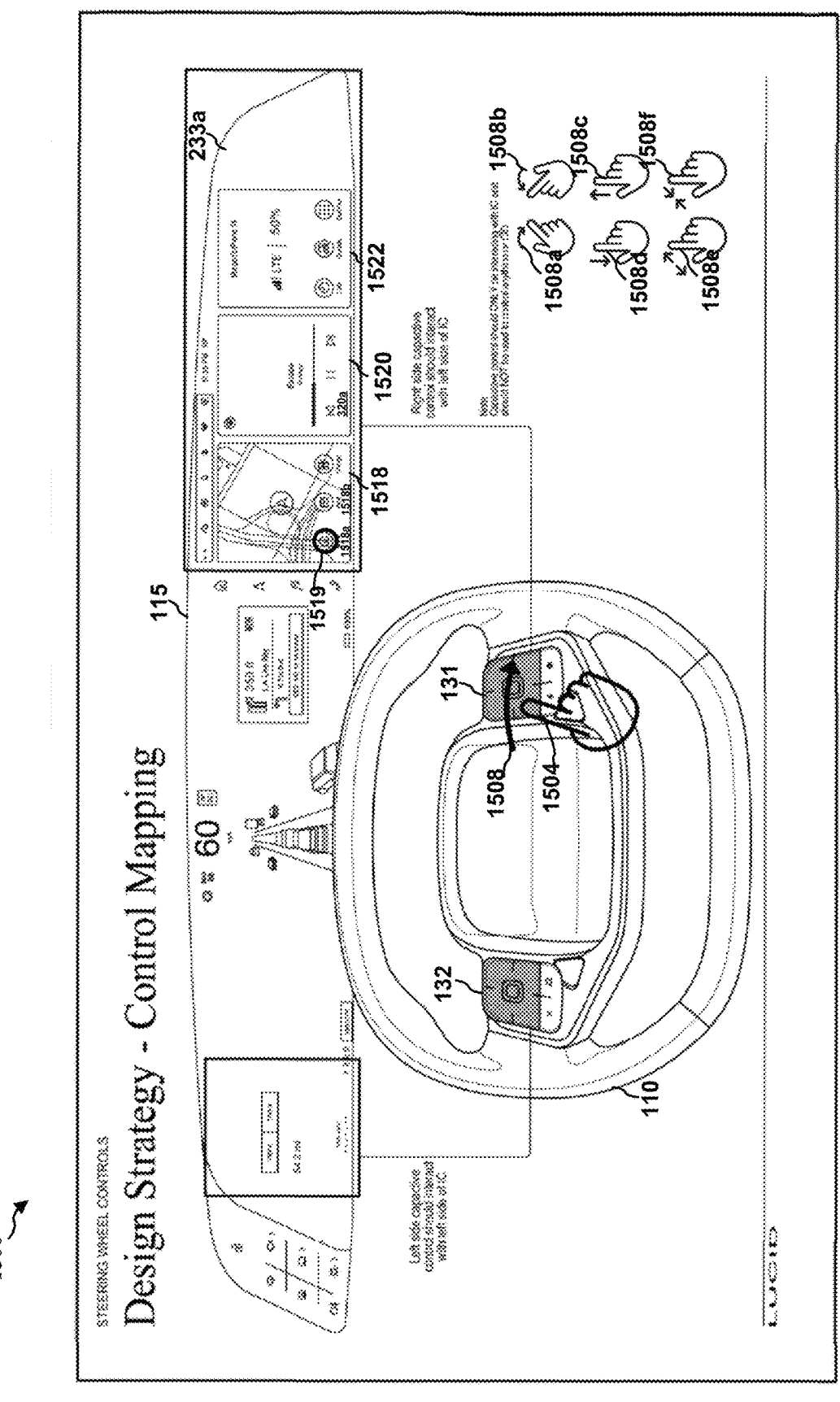
FIG. 15 illustrate an example of using capacitive controllers to scroll through graphical user interface (GUI) elements and select the GUI elements with one hand and a single finger (e.g., the thumb) while driving, according to some embodiments.

FIG. 15 illustrates an example 1500 method of using capacitive controllers to scroll through functions and/or select functions with one hand and a single finger (e.g., the thumb) while driving, according to an embodiment. As shown in FIG. 15, in some embodiments, the right capacitive controller 131 can interact with right side of the front IC cockpit display 115, and the left capacitive controller 132 can interact with left side of the front IC cockpit display 115. Note that in some other embodiments, capacitive controllers 131 and 132 can interact and control GUI components on different sides of the front IC cockpit display 115. It should be understood that the automotive dashboard may include additional components.

Note that although the following embodiments of the present disclosure are described with a reference to the right capacitive controller 131, the embodiments can also be implemented using the left capacitive controller 132. Referring to FIG. 15, the front IC cockpit display 115 can include a screen 233a. In some embodiments, the screen 233a can display multiple graphical representations 1518, 1520, and 1522 of various applications. As illustrated in FIG. 15, graphical representation 1518 can graphically represent navigation application. The graphical representation 1520 can graphically represent media application. The graphical representation 1522 can graphically represent mobile phone application. While the graphical representations 1518, 1520, and 1522 illustrate three examples of applications, the vehicle on-board control system can be configured with more or less graphical representations of applications and/or with different applications that generate different content for display. As can be seen in FIG. 15, the left side of the front IC cockpit display 115 can display information related to trip information; and the center information display (CID) may display information related to speed and driving information. In some embodiments, the left capacitive controller 132 interacts with left side of the front IC cockpit display 115 to scroll through and select features related to: driving assistance (e.g., trip information, speed setting, ACC, HWA, etc.).

In some embodiments, a driver of a vehicle can activate a function by selecting a graphical user interface (GUI) element displayed on a screen 233a of the vehicle using a capacitive controller 131 as illustrated in FIG. 15. The function can include various exemplary functions of any systems of the vehicle, such as, navigation functions (e.g., direction to work, etc.), media functions (e.g., play, adjust volume, select music, etc.), or any function that can be invoked by the selection and/or manipulation of a GUI displayed on a screen.

In some embodiments, a driver of a vehicle can activate a function by selecting a GUI element on a screen of the vehicle using a right capacitive controller 131 as illustrated in FIG. 15. To implement these embodiments, a vehicle on-board system controller 2001 (as will be described in FIG. 20) can detect an active selection of a first GUI element 1518a on the screen 233a of the vehicle made by using the right capacitive controller 131 positioned on a steering wheel 110 of the vehicle. In some embodiments, the vehicle on-board system controller 2001 can highlight the active selection of the first GUI element 1518a using a highlight 1519 that surrounds the first GUI element 1518a. Other highlighting techniques may be used (e.g., change in brightness, change in color, change in size, etc.)

The vehicle on-board system controller 2001 can detect a movement of a finger 1504 of a driver in the vehicle across the right capacitive controller 131 on the steering wheel 110 of the vehicle. The vehicle on-board system controller 2001 can determine a direction 1508 of the movement of the finger 1504 across the right capacitive controller 131. The direction of the movement of the finger 1504 can include a swipe gesture in at least one of: a right direction 1508a, a left direction 1508b, an up direction 1508c, a down direction 1508d, or a diagonal direction 1508e, 1508f.

In some embodiments, in response to detecting a swipe gesture across the right capacitive controller 131, the vehicle on-board system controller 2001 can automatically move the active selection to a second selectable GUI element 1518b on the screen 233a based on the direction of the movement of the finger 1504. The second selectable GUI element 1518b can be closest to the first GUI element 1518a in the direction 1508 of the movement of the finger 1504.

In some embodiments, the first GUI element 1518a and the second selectable GUI element 1518b can be part of a graphical representation of an application on the screen of the vehicle selected to provide an input (e.g., a control input, selection, etc.) to the application. Referring to FIG. 15, the first GUI element can represent a "Home" button 1518a on the graphical representation of navigation application 1518. The second selectable GUI element can represent "Work" button 1518b on the graphical representation of navigation application 1518.

In some other embodiments, the first GUI element and the second selectable GUI element can be parts of different graphical representations of an application on the screen of the vehicle. The second selectable GUI element can represent Rewind button 320a on the graphical representation 1520 of media application.

Figures 16A, 16B:
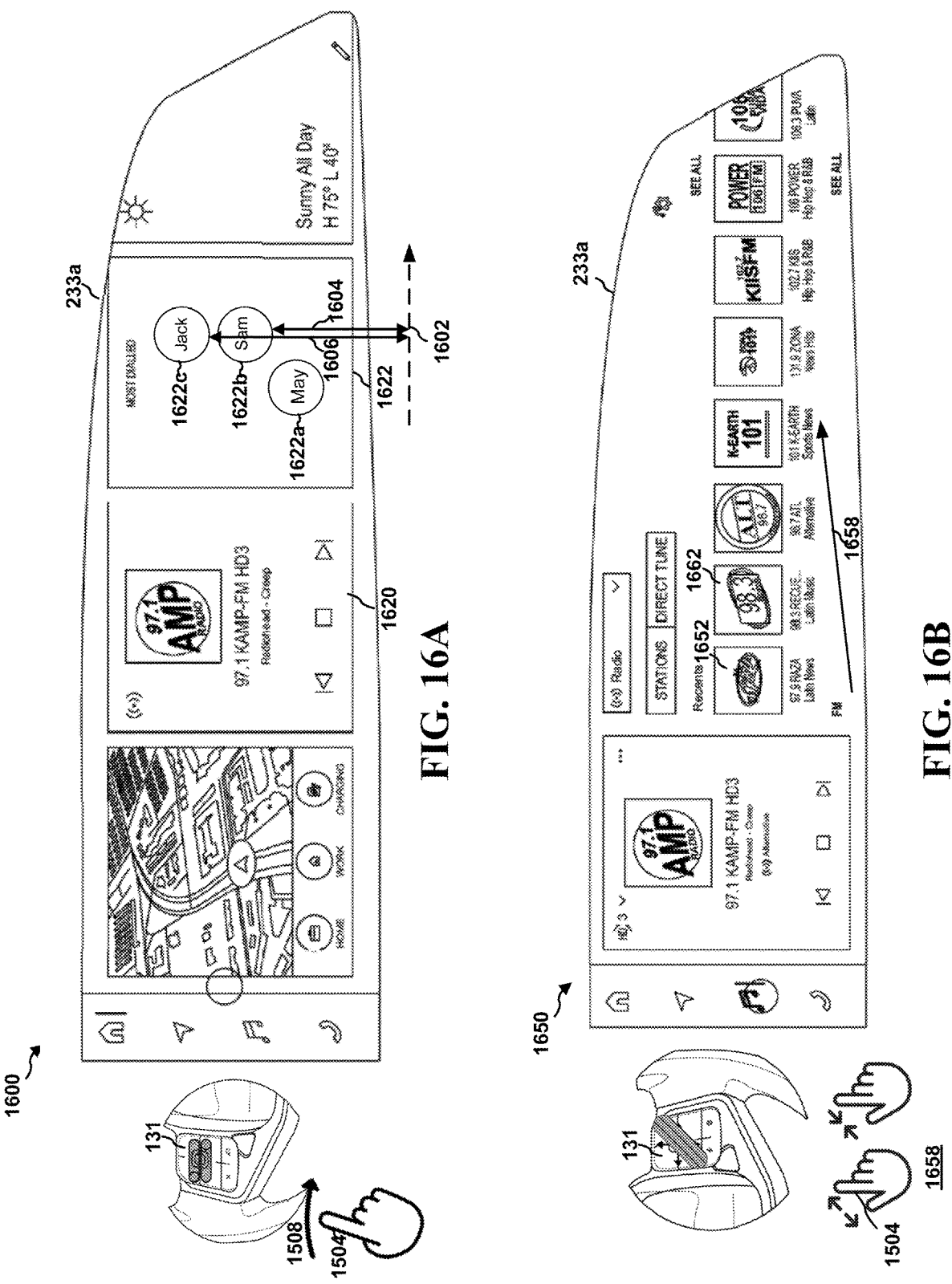
FIGS. 16A-16B illustrate various examples of using capacitive controllers to scroll through GUI elements and select the GUI elements when the selectable GUI element is not in the direction of the direct path of the movement of the finger, according to some embodiments.

FIG. 16A illustrates another example method 1600 of using capacitive controllers to scroll through GUI elements and select GUI elements when the selectable GUI element is not in the direction of the movement of the finger, according to some embodiments. In some embodiments, a vehicle on-board system controller 2001 can automatically move the active selection to another selectable GUI element such as, for example, a third selectable GUI element 1622b of a graphical representation 1622 on the screen 233a. In some embodiments, the third selectable GUI element 1622b is not in the direct path along that follows the direction 1508 of the movement of the finger 1504. For example, referring to FIG. 16A, the vehicle on-board system controller 2001 detects contact "May" 1622a as the active selection of a GUI element on the screen 233a. As the driver performs a swipe gesture across the right capacitive controller 131, the vehicle on-board system controller 2001 detects the direction 1508 of the movement of the finger 1504 of the driver is in a right horizontal direction. The vehicle on-board system controller 2001 moves the active selection to a GUI element representing contact "Sam" 1622b on the screen 233a. However, in some embodiments, if the currently selected GUI element is "May" 1622a and the user swipes horizontally or vertically across the right capacitive controller 131, the vehicle on-board system controller 2001 still moves the active selection to "Sam" 1622 which is the next closest GUI element in the direction of movement. In some other embodiments, if the currently selected GUI element is media application 1620 and the user swipes horizontally or vertically across the right capacitive controller 131, the vehicle on-board system controller 2001 moves the active selection to mobile phone application 1622 which is the next closest card in the direction of movement.

FIG. 16B illustrates another example 1650 method of using capacitive controllers to scroll through GUI elements and select the GUI elements when the selectable GUI element is not in the direction of the movement of the finger, according to an embodiment. Referring to FIG. 16B, the vehicle on-board system controller 2001 detects "Latin News" 1652 as the active selection of a GUI element on the screen 233a. As the driver performs a swipe gesture across the right capacitive controller 131, the vehicle on-board system controller 2001 detects the direction of the movement 1658 of the finger 1504 of the driver is in a diagonal direction. The vehicle on-board system controller 2001 moves the active selection to a selectable GUI element closest to the GUI element (Latin Music 1662) in the direction of the movement of the finger. As shown on FIG. 16B, the vehicle on-board system controller 2001 moves the active selection to the GUI element representing "Latin Music" 1662 on the screen 233a.

In some embodiments, referring to FIGS. 16A-16B, a vehicle on-board system controller 2001 can calculate a distance between a trajectory 1602 of the movement of the finger and the third selectable GUI element. The vehicle on-board system controller 2001 determines a trajectory 1602 of the movement of the finger. Then, the vehicle on-board system controller 2001 identifies the selectable GUI elements (e.g., 1622b) that are not in the direction of the movement of the finger. The vehicle on-board system controller 2001 calculates a distance between the trajectory 1602 of the movement of the finger and the selectable GUI elements (e.g., GUI element 1622b and GUI element 1622c) that are not in the direction of the movement of the finger. As shown in FIG. 16A, the vehicle on-board system controller 2001 calculates a distance 1604 between the trajectory 1602 and the selectable GUI element 1622b. Similarly, the vehicle on-board system controller 2001 calculates a distance 1606 between the trajectory 1602 and the selectable GUI element 1622c. The vehicle on-board system controller 2001 can compare the calculated distances (e.g., distance 1604 and distance 1606) between the trajectory of the movement of the finger and the selectable GUI elements (e.g., GUI element 1622b and GUI element 1622c) to identify the smallest distance between the trajectory 1602 and the selectable GUI elements. For example, the vehicle on-board system controller 2001 determines to move the active selection to the third selectable element (e.g., 1622b)

because the distance between the trajectory 1602 of the movement of the finger and the selectable GUI element (e.g., 1622b) is the smallest.

FIG. 17 illustrates an example 1700 feedback mechanism in response to detecting the active selection of a selectable GUI element, according to some embodiments. In some embodiments, in response to detecting the active selection of the second selectable GUI element, the vehicle on-board system controller 2001 can trigger a feedback mechanism, such as, for example, an audible feedback, a visual feedback, or a haptic feedback so the driver's attention is guided to the second selectable GUI element. These feedback mechanisms can highlight the second selectable GUI element that is currently selected on the screen 233a. Referring to FIG. 5, after the driver performs a swipe gesture in a right horizontal direction 1508a on the right capacitive controller 131, the vehicle on-board system controller 2001 moves the active selection to GUI element 1720 representing "Latin music". The driver presses the capacitive controller to select (e.g., trigger the action associated with the GUI element 1720) the GUI element 1720. In some embodiments, the vehicle on-board system controller 2001 can generate a chime sound 1729 to indicate that the GUI element 1720 representing "Latin music" has been successfully selected. In some other embodiments, the vehicle on-board system controller 2001 can highlight the GUI element (e.g., generate a highlight 1739 surrounding the GUI element 1720) as a visual cue to indicate that "Latin music" has been successfully selected. In this manner, the feedback mechanisms provide an indication of what is currently selected on the screen 233a so driver's attention is guided to an active selection of the selectable GUI element.

In some embodiments, the driver can deactivate the feedback mechanism to prevent any type of feedback mechanism from occurring. In some other embodiments, the driver can deactivate a subset of feedback mechanisms (e.g., one or more) while retaining the trigger of other feedback mechanisms. In further embodiments, a user setting modifiable by a driver of the vehicle can determine the type of the feedback mechanism. For example, a driver A can change a user setting to activate an audible feedback only while another driver B can activate both an audible feedback and a visual feedback using the user setting. Various methods for determining the identity of the driver in order to automatically set the personal user settings may be used. For example, facial recognition techniques can be used to identify a driver and then to activate the corresponding user setting.

In some embodiments, in response to detecting a direction 1508 of a movement of the finger 1504 of the driver in the vehicle, the vehicle on-board system controller 2001 can illuminate a surface of the capacitive controller based on the movement of the finger of the driver to feedback the driver of the vehicle that an action has been detected. The illumination of the capacitive controller can provide a feedback mechanism to indicate to the driver that the driver's action (e.g., swiping across the capacitive controller) has been detected. This guides the driver to increase the accuracy of the swiping of the capacitive controller (within the area of touch input). If the driver does not observe an illumination feedback on the capacitive controller, the driver understands that the swipe or touch is not detected. Such feedback informs the driver to swipe or touch the capacitive controller again if they want to perform the intended action. For example, referring to FIG. 17, if the driver performs a swipe gesture across the right capacitive controller 131 in a horizontal direction, then in response, the vehicle on-board system controller 2001 triggers an illumination 1759 on a surface of the right capacitive controller 131 to feedback the driver of the vehicle that an action has been detected.

Figure 18:
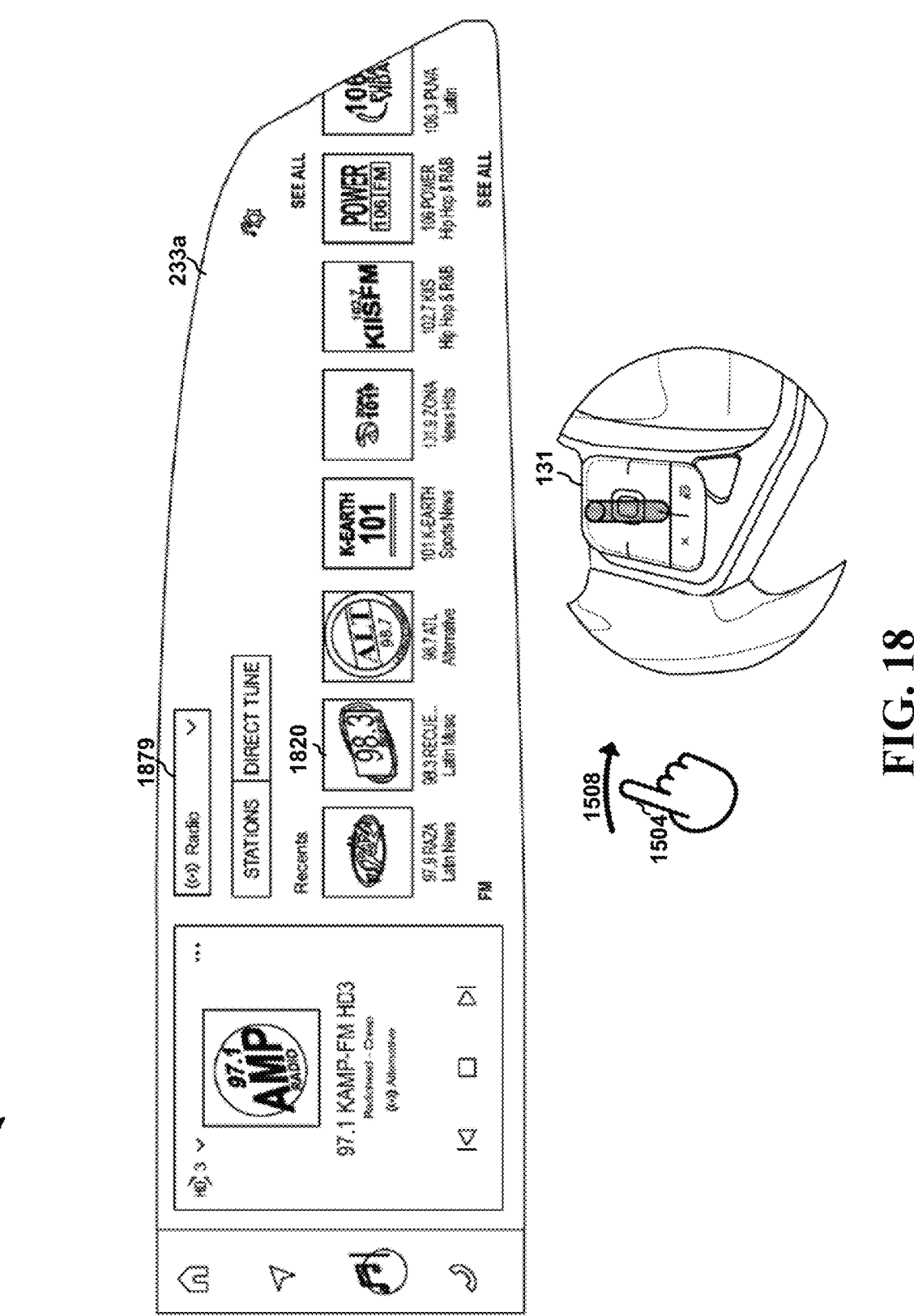
FIG. 18 illustrate an example of using capacitive controllers to scroll through functions while driving, according to an embodiment.

FIG. 18 illustrates a further example 1800 method of using capacitive controllers to activate functions using capacitive controllers while driving, according to some embodiments. In some embodiments, the vehicle on-board system controller 2001 matches the movement of the finger 1504 to a predefined gesture configured based on a preference of the driver, and the vehicle on-board system controller 2001 can select a predefined configuration associated with the predefined gesture. The vehicle on-board system controller 2001 can execute a function according to the predefined configuration. Referring to FIG. 18, while driving, if the driver selects the media application represented by the second GUI 1820, then the action of the driver has selected the media application causes the vehicle on-board system controller 2001 to detect that the active selection is the media application. Then the driver can perform a swipe gesture in an up direction across the right capacitive controller 131 while the active selection is the media application. The vehicle on-board system controller 2001 can determine that the swipe gesture is in an up direction with a predetermined one or more actions depending on the predefined configuration. The predefined configuration can be configured according to a user preference. In some other examples, the predefined configuration can be configured by the vehicle manufacturer. The predefined configuration can indicate that the swipe gesture in an up direction corresponds to one or more actions to scroll a list of songs, to increase a volume of the audio system, increase the temperature of an air conditioning system, etc. As illustrated in FIG. 18, while the active selection is the media application, the swipe gesture causes the media application to toggle between media sources, such as radio 1879.

In some embodiments, the vehicle on-board system controller 2001 can detect a voice command associated with the driver. In response, the vehicle on-board system controller 2001 can deactivate the capacitive controller to lock a function of the capacitive controller.

FIG. 19 is a data flow diagram of some embodiments of a process 1900 for activating a function by selecting a GUI element on a screen of a vehicle using a capacitive controller. The method may be performed by processing logic that may comprise hardware (e.g., circuitry, dedicated logic, programmable logic, a processor, a processing device, a CPU, a system-on-chip, etc.), software (e.g., instructions running/executing on a processing device), firmware (e.g., microcode), or a combination thereof. In some embodiments, at least a portion of the method may be performed based on aspects of FIGS. 1-18.

With reference to FIG. 19, the method illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in the method may be performed in an order different than presented, and that not all of the blocks in the method may be performed.

The method begins at block 1902, where processing logic detects an active selection of a first GUI element on the screen of the vehicle selectable using the capacitive controller positioned on a steering wheel of the vehicle. For example, referring to FIGS. 1-18, a vehicle on-board system controller 2001 can detect an active selection of a GUI element 1518 on the screen 233*a* of the vehicle selectable using the right capacitive controller 131 positioned on a steering wheel 110 of the vehicle. The vehicle on-board control system can display the active selection of the first GUI element 1518 using a highlight 1519 that surrounds the first GUI element 1518.

As also shown in FIG. 19, at block 1904, processing logic detects a movement of a finger of a driver in the vehicle across the capacitive controller on the steering wheel of the vehicle. For example, referring to FIGS. 1-18, the vehicle on-board system controller 2001 detects a movement of a finger 1504 of a driver in the vehicle across the right capacitive controller 131 on the steering wheel 110 of the vehicle, as described above.

As further shown in FIG. 19, at block 1906, processing logic determines a direction of the movement of the finger. For example, referring to FIGS. 1-18, the vehicle on-board system controller 2001 determines a direction 1508 of the movement of the finger 1504. The direction of the movement of the finger 1504 can include a swipe gesture in various directions: a right direction 1508*a*, a left direction 1508*b*, an up direction 1508*c*, a down direction 1508*d*, or a diagonal direction 1508*e*, 1508*f*, as described above.

As additionally shown in FIG. 19, at block 1908, processing logic automatically moves the active selection to a second selectable GUI element on the screen based on the direction of the movement of the finger, the second selectable GUI element being closest to the first GUI element in the direction of the movement of the finger screen. For example, referring to FIGS. 118, the vehicle on-board system controller 2001 can automatically move the active selection to a second selectable GUI element 1518*b* on the screen 233*a* based on the direction of the movement of the finger 1504. The second selectable GUI element 1518*b* can be closest to the first GUI element 1518*a* in the direction of the movement of the finger 1504, as described above.

Although FIG. 19 shows example blocks of data flow diagram of some embodiments of a process 1900, in some implementations, data flow diagram may include additional blocks, fewer blocks, different blocks, or differently arranged blocks than those depicted in FIG. 19. Additionally, or alternatively, two or more of the blocks of data flow diagram may be performed in parallel.

Figure 20:
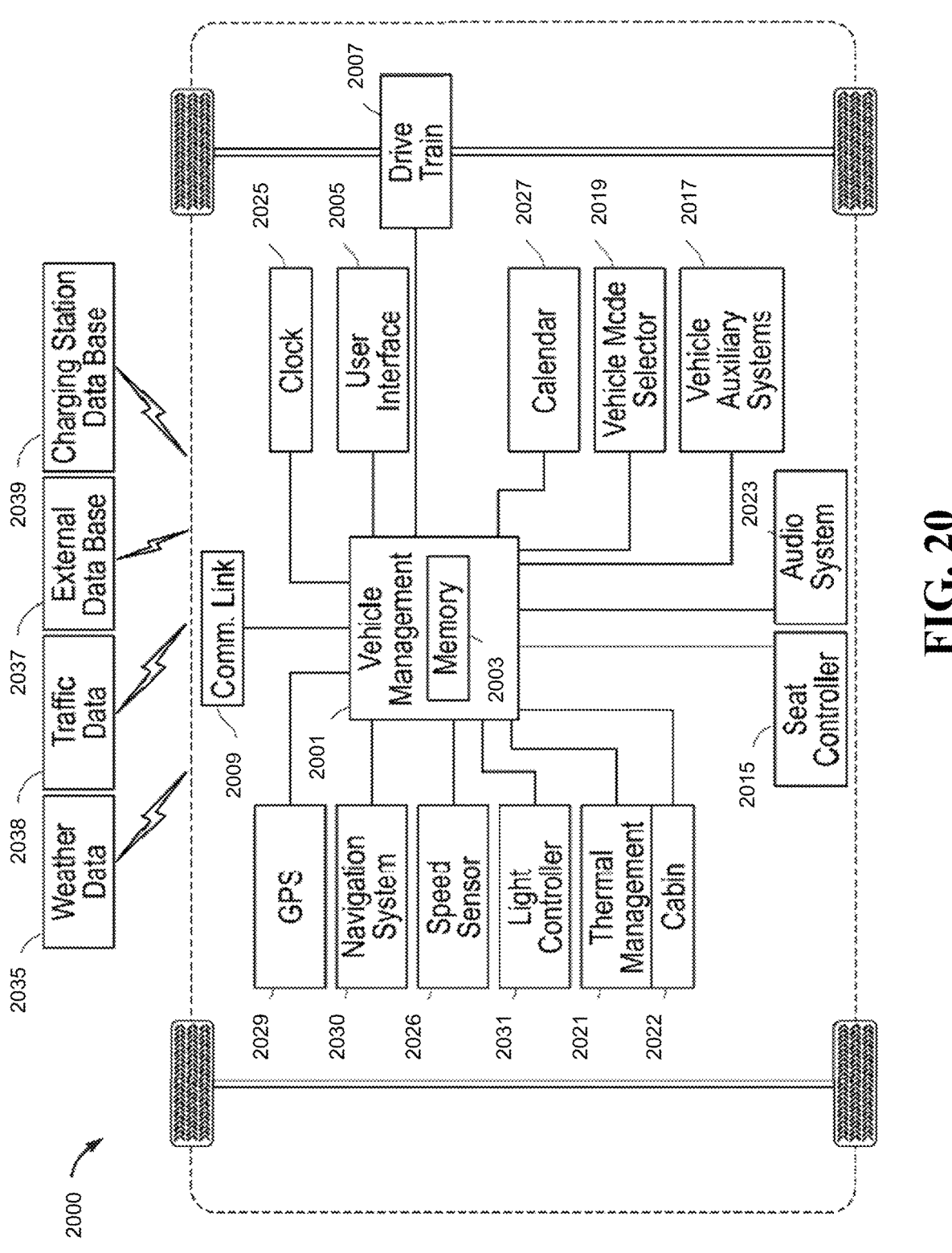
FIG. 20 illustrates system level diagram of a vehicle according to some embodiments of the disclosure.

FIG. 20 is a high-level view of some embodiments of a vehicle 2000. Vehicle 2000 can be an electric vehicle (EV), a vehicle utilizing an internal combustion engine (ICE), or a hybrid vehicle, where a hybrid vehicle utilizes multiple sources of propulsion including an electric drive system. Vehicle 2000 includes a vehicle on-board system controller 2001, also referred to herein as a vehicle management system or system, which is comprised of a processor (e.g., a central processing unit (CPU)). The vehicle on-board system controller 2001 also includes memory 2003, with memory 2003 being comprised of EPROM, EEPROM, flash memory, RAM, solid state drive, hard disk drive, or any other type of memory or combination of memory types. It should be understood that the terms "vehicle management system", "system controller" and "vehicle on-board system controller" can be used interchangeably throughout this disclosure. A user interface 2005 is coupled to vehicle management system 2001. Interface 2005 allows the driver, or a passenger, to interact with the vehicle management system, for example inputting data into the navigation system 2030, altering the heating, ventilation and air conditioning (HVAC) system via the thermal management system 2021, controlling the vehicle's entertainment system (e.g., radio, CD/DVD player, etc.), adjusting vehicle settings (e.g., seat positions, light controls, etc.), and/or otherwise altering the functionality of vehicle 2000. In at least some embodiments, user interface 2005 also includes means for the vehicle management system to provide information to the driver and/or passenger, information such as a navigation map or driving instructions (e.g., via the navigation system 2030 and GPS system 2029) as well as the operating performance of any of a variety of vehicle systems (e.g., battery pack charge level for an EV, fuel level for an ICE-based or hybrid vehicle, selected gear, current entertainment system settings such as volume level and selected track information, external light settings, current vehicle speed (e.g., via speed sensor 2026), current HVAC settings such as cabin temperature and/or fan settings, etc.) via the thermal management system 2021. Interface 2005 may also be used to warn the driver of a vehicle condition (e.g., low battery charge level or low fuel level) and/or communicate an operating system malfunction (battery system not charging properly, low oil pressure for an ICE-based vehicle, low tire air pressure, etc.). Vehicle 2000 can also include other features like an internal clock 2025 and a calendar 2027.

In some embodiments, user interface 2005 includes one or more interfaces including, for example, a front dashboard display (e.g., a cockpit display, etc.), a touch-screen display (e.g., a pilot panel, etc.), as well as a combination of various other user interfaces such as push-button switches, capacitive controls, capacitive switches, slide or toggle switches, gauges, display screens, warning lights, audible warning signals, etc. It should be appreciated that if user interface 2005 includes a graphical display, the vehicle on-board system controller 2001 may also include a graphical processing unit (GPU), with the GPU being either separate from or contained on the same chip set as the processor.

Vehicle 2000 also includes a drive train 2007 that can include an internal combustion engine, one or more motors, or a combination of both. The vehicle's drive system can be mechanically coupled to the front axle/wheels, the rear axle/wheels, or both, and may utilize any of a variety of transmission types (e.g., single speed, multi-speed) and differential types (e.g., open, locked, limited slip).

Drivers often alter various vehicle settings, either when they first enter the car or while driving, in order to vary the car to match their physical characteristics, their driving style and/or their environmental preferences. System controller 2001 monitors various vehicle functions that the driver may use to enhance the fit of the car to their own physical characteristics, such as seat position (e.g., seat position, seat height, seatback incline, lumbar support, seat cushion angle and seat cushion length) using seat controller 2015 and steering wheel position using an auxiliary vehicle system controller 2017. In some embodiments, system controller 2001 also can monitor a driving mode selector 2019 which is used to control performance characteristics of the vehicle (e.g., economy, sport, normal). In some embodiments, system controller 2001 can also monitor suspension characteristics using auxiliary vehicle system controller 2017, assuming that the suspension is user adjustable. In some embodiments, system controller 2001 also monitors those aspects of the vehicle which are often varied by the user in order to match his or her environmental preferences for the cabin 2022, for example setting the thermostat temperature or the recirculation controls of the thermal management system 2021 that uses an HVAC controller, and/or setting the radio station/volume level of the audio system using controller 2023, and/or setting the lights, either internal lighting or external lighting, using light controller 2031. Also, besides using user-input and on-board sensors, system controller 2001 can also use data received from an external on-line source that is coupled to the controller via communication link 2009 (using, for example, GSM, EDGE, UMTS, CDMA, DECT, WiFi, WiMax, etc.). For example, in some embodiments, system controller 2001 can receive weather information using an on-line weather service 2035 or an on-line data base 2037, traffic data 2038 for traffic conditions for the navigation system 2030, charging station locations from a charging station database 2039, etc.

As an example, upon turning on the vehicle 2000, in some embodiments, system controller 2001 identifies the current driver (and go to their last pre-set functions) or just go the last pre-set functions for the vehicle (independent of who the current driver is), related to such features as: media functions, climate functions-heating, ventilation and air conditioning (HVAC) system, driving functions, seat positioning, steering wheel positioning, light control (e.g., internal lighting, external lighting, etc.), navigation functions, etc. Note that for purposes herein, the techniques will be described with reference to capacitive controllers. Even so, the techniques are not limited to the capacitive controllers and can be employed with other types of controllers.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In some embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software or may deploy the software to a customer for a given period of time. Numerous combinations of the above models are possible and are contemplated.

Various units, circuits, or other components may be described or claimed as "configured to" or "configurable to"

perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein but may be modified within the scope and equivalents of the appended claims.

What is claimed is:

1. A method of activating a function by selecting a graphical user interface (GUI) element on a screen of a vehicle using a capacitive controller, comprising:

detecting an active selection of a first GUI element on the screen of the vehicle selectable using the capacitive controller positioned on a steering wheel of the vehicle;

detecting a movement of a finger of a driver in the vehicle across the capacitive controller on the steering wheel of the vehicle;

determining a direction of the movement of the finger;

automatically moving the active selection to a second selectable GUI element on the screen based on the direction of the movement of the finger, the second selectable GUI element being closest to the first GUI element in the direction of the movement of the finger;

calculating a plurality of distances between a trajectory of the movement of the finger and a plurality of selectable GUI elements for moving the active selection to a third selectable GUI element of the plurality of selectable GUI elements; and determining to move the active selection to the third selectable GUI element based on a comparison of the plurality of distances between the trajectory of the movement of the finger and the plurality of selectable GUI elements, the third selectable GUI element being closest to the second selectable GUI element.

2. The method of claim 1, wherein the first GUI element and the second selectable GUI element are parts of a graphical representation of an application on the screen of the vehicle.

3. The method of claim 1, wherein the first GUI element and the second selectable GUI element are parts of different graphical representations of an application on the screen of the vehicle.

4. The method of claim 1, wherein the direction of the movement of the finger comprises:
a swipe gesture in at least one of:
a right direction;
a left direction;
an up direction;
a down direction; or
a diagonal direction.

5. The method of claim 1, further comprising:
automatically moving the active selection to the third selectable GUI element on the screen, wherein the third selectable GUI element is not in the direction of the movement of the finger.

6. The method of claim 1, further comprising:
in response to detecting the active selection of the second selectable GUI element, triggering at least one of:
an audible feedback,
a visual feedback, or
a haptic feedback.

7. The method of claim 1, further comprising:
in response to detecting a movement of the finger of the driver in the vehicle, illuminating a surface of the capacitive controller based on the movement of the finger of the driver to feedback the driver of the vehicle that an action has been detected.

8. The method of claim 1, further comprising:
matching the movement of the finger to a predefined gesture configured based on a preference of the driver;
selecting a predefined configuration associated with the predefined gesture; and
executing a function according to the predefined configuration.

9. The method of claim 1, further comprising:
detecting a voice command associated with the driver; and
in response to detecting the voice command, deactivating the capacitive controller to lock a function of the capacitive controller.

10. The method of claim 1, further comprising:
in response to automatically moving the active selection the second selectable GUI element, providing a feedback to the driver of the vehicle.

11. The method of claim 10, wherein the providing the feedback to the driver of the vehicle comprises at least one of:
highlighting an edge of the second selectable GUI element as a visual acknowledgement to the driver of the vehicle; or
generating a tone as an audio acknowledgement to the driver of the vehicle.

12. A system for activating a function by selecting a graphical user interface (GUI) element on a screen of a vehicle using a capacitive controller comprising:

one or more processors configured to:
detect an active selection of a first GUI element on the screen of the vehicle selectable using the capacitive controller positioned on a steering wheel of the vehicle;
detect a movement of a finger of a driver in the vehicle across the capacitive controller on the steering wheel of the vehicle;
determine a direction of the movement of the finger; and
automatically move the active selection to a second selectable GUI element on the screen based on the direction of the movement of the finger, the second selectable GUI element being closest to the first GUI element in the direction of the movement of the finger;
calculate a plurality of distances between a trajectory of the movement of the finger and a plurality of selectable GUI elements for moving the active selection to a third selectable GUI element of the plurality of selectable GUI elements; and
determine to move the active selection to the third selectable GUI element based on a comparison of the plurality of distances between the trajectory of the movement of the finger and the plurality of selectable GUI elements, the third selectable GUI element being closest to the second selectable GUI element.

13. The system of claim 12, wherein the first GUI element and the second selectable GUI element are parts of a graphical representation of an application on the screen of the vehicle.

14. The system of claim 12, wherein the first GUI element and the second selectable GUI element are parts of different graphical representations of an application on the screen of the vehicle.

15. The system of claim 12, wherein the direction of the movement of the finger comprises:
a swipe gesture in at least one of:
a right direction;
a left direction;
an up direction;
a down direction; or
a diagonal direction.

16. A non-transitory computer-readable medium storing a set of instructions for activating a function by selecting a graphical user interface (GUI) element on a screen of a vehicle using a capacitive controller comprising:
one or more instructions that, when executed by one or more processors of a device, cause the device to:
detect an active selection of a first GUI element on the screen of the vehicle selectable using the capacitive controller positioned on a steering wheel of the vehicle;
detect a movement of a finger of a driver in the vehicle across the capacitive controller on the steering wheel of the vehicle;
determine a direction of the movement of the finger; and
automatically move the active selection to a second selectable GUI element on the screen based on the direction of the movement of the finger, the second selectable GUI element being closest to the first GUI element in the direction of the movement of the finger;
calculate a plurality of distances between a trajectory of the movement of the finger and a plurality of selectable GUI elements for moving the active selection to a third selectable GUI element of the plurality of selectable GUI elements; and
determine to move the active selection to the third selectable GUI element based on a comparison of the plurality of distances between the trajectory of the movement of the finger and the plurality of selectable GUI elements, the third selectable GUI element being clos-
est to the second selectable GUI element.

17. The non-transitory computer-readable medium of claim 16, wherein the first GUI element and the second selectable GUI element are parts of a graphical representa- tion of an application on the screen of the vehicle.

18. The non-transitory computer-readable medium of claim 16, wherein the first GUI element and the second selectable GUI element are parts of different graphical representations of an application on the screen of the vehicle.

19. The non-transitory computer-readable medium of claim 16, wherein the direction of the movement of the finger comprises:

a swipe gesture in at least one of:
a right direction;
a left direction;
an up direction;
a down direction; or
a diagonal direction.

\* \* \* \* \*